(12) United States Patent
Brahma et al.

(10) Patent No.: US 7,810,314 B2
(45) Date of Patent: Oct. 12, 2010

(54) APPROACH FOR CONTROLLING PARTICULATE MATTER IN AN ENGINE

(75) Inventors: Avra Brahma, Dearborn, MI (US); Jagjit Nanda, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 791 days.

(21) Appl. No.: 11/761,704

(22) Filed: Jun. 12, 2007

(65) Prior Publication Data

US 2008/0307770 A1    Dec. 18, 2008

(51) Int. Cl.
  *F01N 3/00* (2006.01)
  *F02B 27/04* (2006.01)
  *G01N 37/00* (2006.01)
  *B01D 53/30* (2006.01)

(52) U.S. Cl. ............... 60/276; 60/273; 60/285; 60/295; 60/297; 73/28.01; 96/111

(58) Field of Classification Search ............ 60/273, 60/275, 276, 277, 285, 295, 297; 73/28.01; 96/111
See application file for complete search history.

(56) References Cited

U.S. PATENT DOCUMENTS

| 6,528,020 | B1 | 3/2003 | Dai et al. |
| 7,318,908 | B1* | 1/2008 | Dai ............................ 422/68.1 |
| 2001/0051108 | A1 | 12/2001 | Schonauer |
| 2005/0129573 | A1* | 6/2005 | Gabriel et al. ................. 422/58 |
| 2005/0180888 | A1* | 8/2005 | Pidria et al. ................... 422/83 |
| 2007/0039858 | A1* | 2/2007 | Noca et al. ..................... 210/94 |
| 2008/0143351 | A1* | 6/2008 | Lee et al. ..................... 324/698 |

FOREIGN PATENT DOCUMENTS

WO   WO 2004/065926    8/2004

* cited by examiner

*Primary Examiner*—Thomas E Denion
*Assistant Examiner*—Audrey Klasterka
(74) *Attorney, Agent, or Firm*—Julia Voutyras; Alleman Hall McCoy Russell & Tuttle LLP

(57) ABSTRACT

A method for operating an engine comprises correlating a measured property associated with a carbon nanostructure layer to an amount of particulate matter from an exhaust stream of the engine. In this way, engine operation may be adjusted based on an amount of sensed particulate matter.

14 Claims, 4 Drawing Sheets

APPROACH FOR CONTROLLING PARTICULATE MATTER IN AN ENGINE

TECHNICAL FIELD

The present application relates to the field of automotive emission control systems and methods.

BACKGROUND AND SUMMARY

Diesel engines may include various components to control a variety of atmospheric emissions produced by the engine. For example, diesel engines may include a diesel particulate filter to trap soot and other particulate matter emitted by the engine.

Various approaches have been used to determine an amount of soot emissions in an engine's exhaust. For example, models may be used to estimate amounts of particulate matter produced in real-time. Alternatively, soot sensors, such as soot sensors including an aluminum oxide ceramic for measuring particulate matter, may be used. However, model accuracy may be sufficiently degraded to provide high enough resolution for soot emission determination. Likewise, available soot sensor may have insufficient sensitivity and response times.

The inventors herein have realized that accurate particulate matter information for controlling processes and parameters may be realized by a method for operating an engine comprising correlating a measured property associated with a carbon nanostructure layer to an amount of particulate matter from an exhaust stream of the engine, wherein the carbon nanostructure includes a plurality of carbon nanostructures, and adjusting engine operation based on the amount of particulate matter.

For example, the inventors have recognized that a soot sensor including a carbonaceous material rather than a ceramic substrate may facilitate higher sensitivity and faster response times for measuring carbonaceous particulate matter. Even further, carbon nanostructures may be functionalized to facilitate sensitivity to a plurality of constituents in the exhaust stream of the engine. In this way, it may be possible to facilitate more appropriately timed and more accurately controlled regeneration of a diesel particulate filter.

DETAILED DESCRIPTION OF THE DEPICTED EMBODIMENTS

Figure 1:
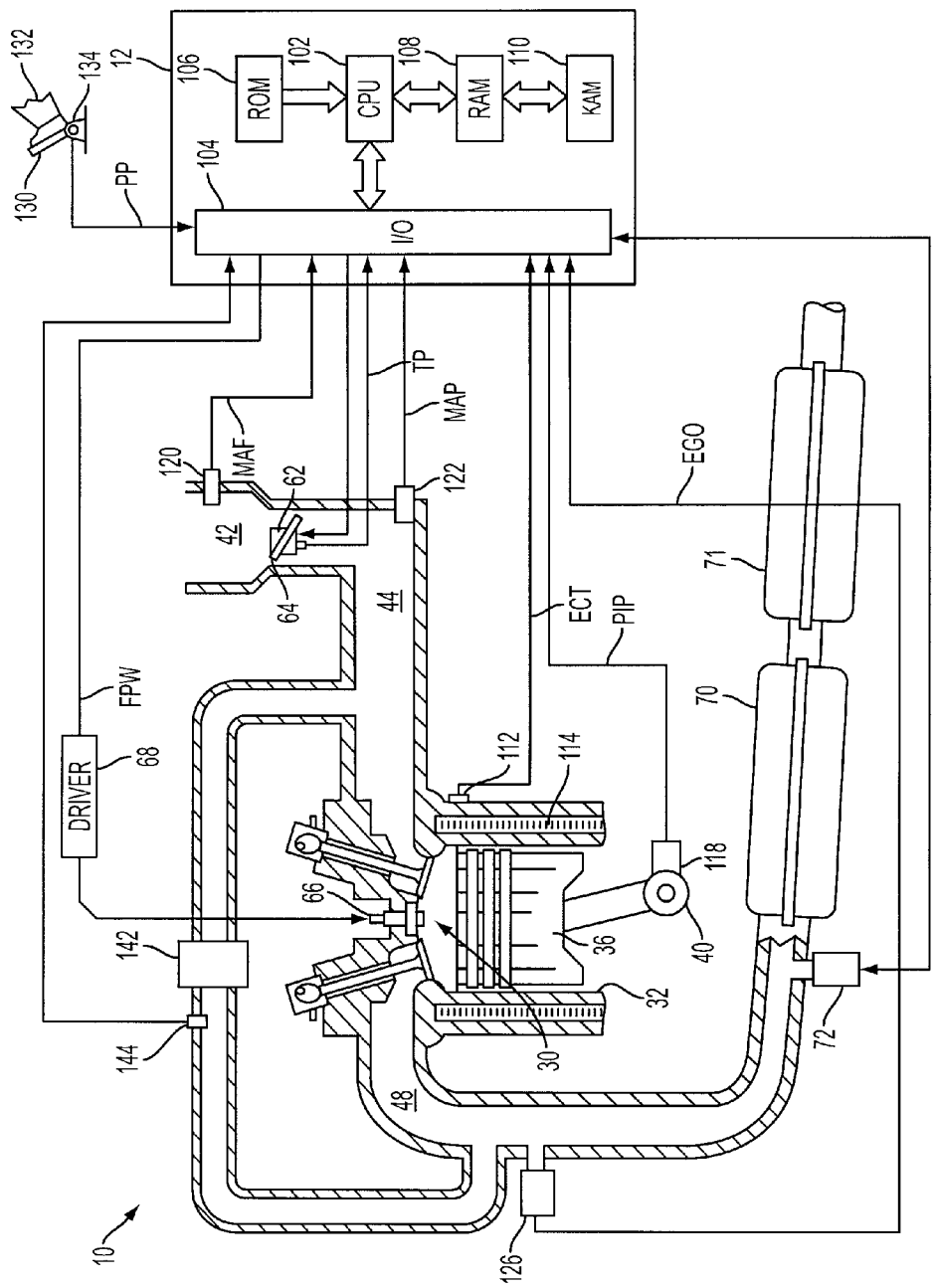
FIG. 1 shows an exemplary embodiment of an internal combustion engine and control system.

FIG. 1 is a schematic diagram showing one cylinder of multi-cylinder diesel engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 48 may be varied by controller 12 via EGR valve 142. Further, an EGR sensor 144 may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 48 downstream of exhaust gas sensor 126. In some embodiments, emission control device 70 may be a diesel oxidation catalyst, although various other emission control devices may be included. During operation of engine 10, emission control device 70 may be periodically reset by operating at least one cylinder of the engine within a particular air/fuel ratio. Diesel particulate filter 71 is shown arranged downstream of emission control device 70. Diesel particulate filter may be configured to remove diesel particulate matter and/or soot from the exhaust of engine 10. Under some conditions, diesel particulate filter 71 may be regenerated to remove accumulated diesel particulate matter and/or soot from the filter.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

A diesel particular sensor 72 is shown coupled to exhaust manifold 48 upstream of emission control device 70 and diesel particulate filter 71. Diesel particulate sensor 72 may be configured to output a signal to controller 12 in response to a detected amount of soot in the engine exhaust, as will be described in more detail below. Diesel particulate filter may also be configured to receive a signal from controller 12, such as a control signal for controlling a temperature of the sensor, a voltage applied to electrodes in the sensor, etc. In an alternative embodiment, sensor 98 may be configured to measure the concentration of other species besides diesel particulate matter, including but not limited to $NO_2$, $NH_3$, and other particles.

It may be appreciated that diesel particulate matter sensor 72 may be disposed upstream of diesel particulate filter 72, between diesel particulate filter 72 and emission control device 70, downstream of emission control device 70, or some combination thereof. In one example, a diesel particulate matter sensor disposed downstream of diesel particulate filter 72 may be configured to diagnose the emission control system when an amount of particulate matter in the exhaust stream may exceed a predetermined amount. In another example, a diesel particulate matter sensor disposed upstream of diesel particulate filter 71 may be configured to selectively regenerate the diesel particulate filter. As such, the upstream particulate matter sensor may be configured to selectively adjust an air-fuel ratio to the engine to increase a temperature of the exhaust introduced to the diesel particulate filter. In yet another example, the upstream particulate matter sensor may be configured to determine degradation of the sensor. These features may be described in more detail below.

Diesel particulate sensor 72 may be used both for control of the diesel particulate filter and for on-board diagnostics (OBD) to ensure the vehicle does not exceed the diesel particulate matter emissions standards. FIG. 2 and FIG. 3 show schematic views of two exemplary embodiments of a diesel particulate matter sensor. In particular, the diesel particulate sensors described herein may be configured to measure an amount of diesel particulate matter in an exhaust stream. Specifically, the diesel particulate matter sensor may be configured to correlate an electrical property associated with a deposition layer to an amount of particulate matter accumulated on the deposition layer of the diesel particulate matter sensor. As such, the deposition layer may be electrically coupled to an electrical circuit via measuring leads. For example, gold wires may be connected to the carbon nanostructure layer using a silver epoxy. Various electrical properties of the carbon nanostructure layer may be measured by an electrical circuit. For example, a Wheatstone bridge may be used to measure a resistance of the carbon nanostructure layer, although it may be desirable to use capacitive or impedance type measurements.

It may be desirable to measure an electrical property associated with a carbonaceous deposition layer. For example, the sensitivity to carbonaceous particulate matter, such as soot from a diesel engine, may be increased when monitoring an electronic response associated with a carbonaceous deposition layer.

In some embodiments, the deposition layer may include a carbon nanostructure layer. Carbon nanostructures of various shapes, diameters, lengths, etc. may be used to form the carbon nanostructure layer. Carbon nanostructure layer may include carbon nanotubes, although carbon nanowires, nanofibers, nanorods, various other nanostructures, or some combination thereof may be used to form the carbon nanostructure layer. In one example, carbon nanostructure layer may include carbon nanotubes in the range of 4 to 5 nanometers in diameter and 500 to 600 nanometers in length. Further, carbon nanostructure layer may include single wall nanostructures or multi-wall nanostructures.

Carbon nanostructures may be functionalized to modify a property associated with the carbon nanostructure. In some embodiments, carbon nanostructures may be functionalized to facilitate sensitivity to carbonaceous particulate matter. In particular, carbon nanostructures may be functionalized with water soluble chemical moieties to facilitate dispersion in aqueous solution for deposition on the surface of a substrate. In particular, carbon nanotubes may be functionalized with an electrically conducting polymer group, such as (poly) amino benzo-sulfonic (PABS), to facilitate water solubility while maintaining a high conductivity of carbon nanostructure layer. In one example, a powder of PABS-functionalized carbon nanotubes may be dissolved in de-ionized water to obtain a maximum solubility of 5 mg/mL. Aqueous solutions of carbon nanotubes may be bath sonicated (e.g. for two hours) to facilitate increased homogenization. A carbon nanostructure layer may be drop cast as a film on a surface of substrate, although carbon nanostructure layer may be deposited by various other methods. In one example, a carbon nanostructure layer comprises a drop cast film on a silicon wafer substrate from aqueous carbon nanotube solution of about 10 microns thick. In another example, a mat of nanostructures may be formed by applying an electrical charge to aqueous carbon nanotube solution via an electrospinning process.

It may be appreciated that the carbon nanostructures may be functionalized with various other functional groups. As such, the carbon nanostructures of the particulate matter sensors described herein may be functionalized to detect various other constituents alternately or in addition to particulate matter in the exhaust stream of the engine. For example, the carbon nanostructures may be functionalized to detect various gaseous components in the exhaust, such as nitrogen oxides, ammonia, etc. Further, it may be appreciated that the carbon nanostructures may be functionalized to facilitate increased thermal stability. For example, regeneration of the carbon nanostructure layer may be facilitated via the thermal decomposition of particulate matter deposited in the carbon nanostructure layer with reduced thermal degradation of the carbon nanostructure layer when modified by a functional group to increase thermal stability of the carbon nanostructures.

Figure 2A:
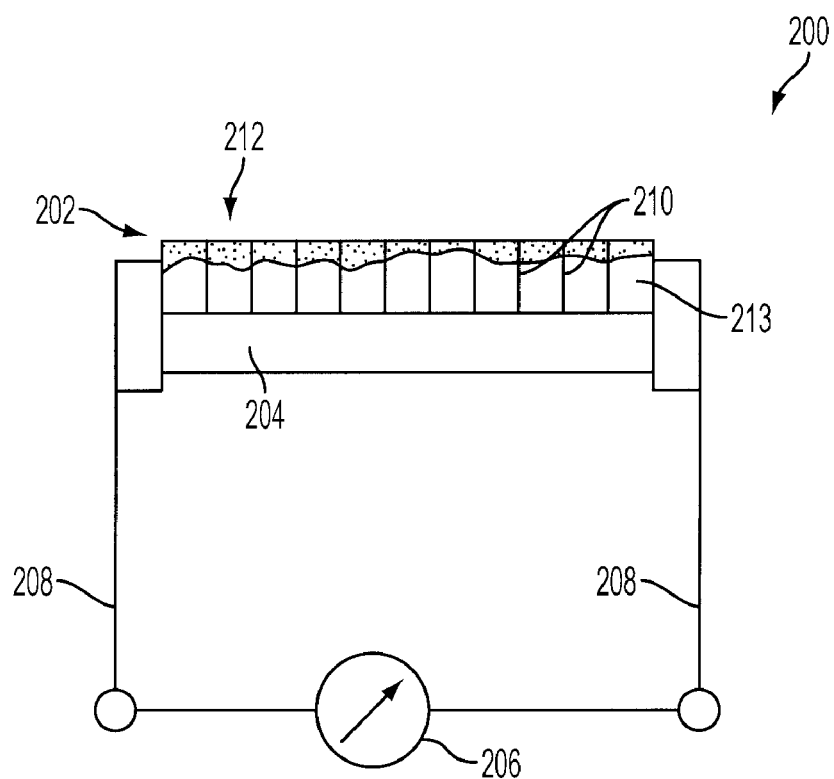
FIG. 2 is a schematic depiction of a first exemplary embodiment of a diesel particulate matter sensor.

The embodiment illustrated in FIG. 2 shows a view of a carbon nanostructure layer deposited on a substantially planar substrate, while the carbon nanostructure layer of FIG. 3 may be shown deposited on the surface of a cylindrical substrate. Referring first to the embodiment schematically illustrated in FIG. 2A, sensor 200 comprises a carbon nanostructure layer 202 disposed on a planar substrate 204 connected to an electrical circuit 206 via measuring leads 208. Planar substrate 204 may be a silicon wafer, although silica, glass, various other materials, or some combination thereof may be used. In some embodiments, carbon nanostructure layer 202 may include a plurality of carbon nanostructures 210. In particular, carbon nanostructures 210 may define one or more openings in carbon nanostructure layer 202. For example, carbon nanostructure layer 202 may be a mesh including a plurality of carbon nanostructures. Electrical properties associated with carbon nanostructure layer may be monitored by electrical circuit 206 via measuring leads 208. For example, a resistance of carbon nanostructure layer 202 may have a resistance typically ranging between 70 to 110 K-ohms.

Figure 2B:
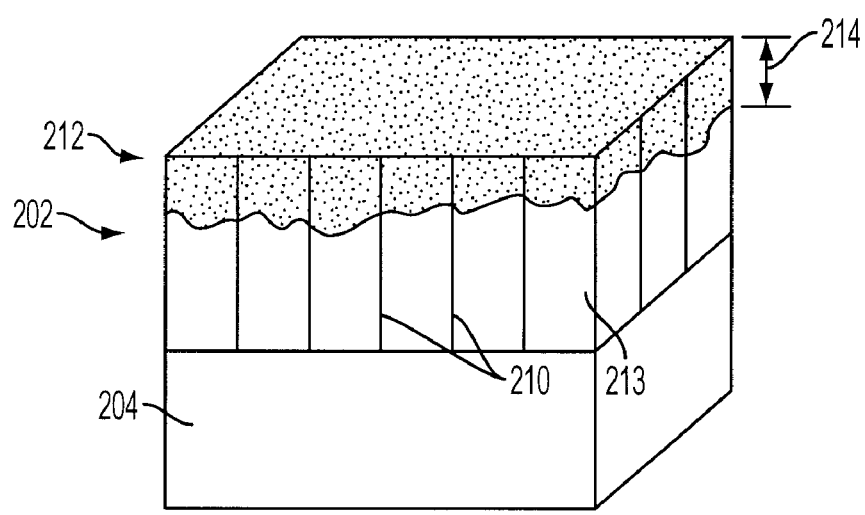

Under some conditions, such as during engine operation, an amount of particulate matter 212 may be deposited on carbon nanostructure layer 202. In particular, particulate matter 212 may accumulate at opening 213. FIG. 2B shows a view of carbon nanostructure layer 202 disposed on planar substrate 204 after an amount of particulate matter 212 may be deposited. It may be understood that, as deposition of particulate matter on carbon nanotubes increases, a thickness 214 of deposited particulate matter may increase. As such, particulate matter may link carbon nanostructures 210 to one another such that various electrical properties of carbon nanostructure layer 202 may change. In one example, a resistance of carbon nanostructure layer 202 may be reduced when an amount of particulate matter 212 may be deposited on the layer. In this way, sensor 200 may monitor electrical properties associated with carbon nanostructure layer 202 in response to an amount of particulate matter deposited on the carbon nanostructure layer. Further, the sensitivity of sensor 200 to particulate matter may be increased associating the electrical properties of carbon nanostructure layer 202 to an impedance based analysis or any combination of electrical response.

It may be appreciated that the deposition layer may include various other nanostructures. For example, hybrid nanostructures or nanocomposites may include carbon nanostructures, inorganic nanostructures, metal nanostructures, various other nanostructures, or some combination thereof. As such, the sensor may be configured to sense various other constituents, such as nitrogen oxide, ammonia, etc. in an exhaust stream. Alternately or in addition, the sensor may be configured to sense various other properties associated with an amount of constituent linking the nanostructures in the deposition layer. Further, the sensor may be configured to sense variations of a property of the deposition layer in response to various other environmental conditions. For example, a physical property, such as a mechanical stress, may be associated with a measured property of the deposition layer. Even further, an electrical property, for example, may be applied to the deposition layer to alter the sensing function of the deposition layer. In one example, a voltage may be applied to the deposition layer such that the sensor may be configured to measure a tensile stress rather than an amount of deposited constituent. In doing this, the deposition layer may be configured to facilitate a plurality of sensing functions.

Figure 3A:
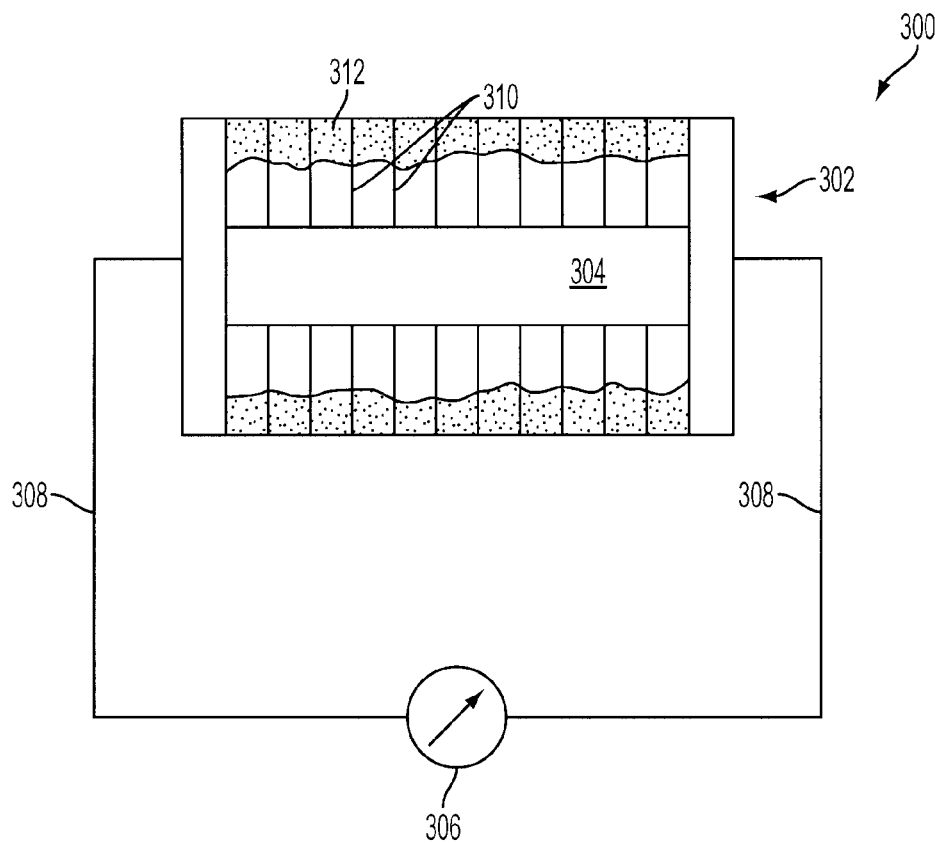
FIG. 3 is a schematic depiction of a second exemplary embodiment of a diesel particulate matter sensor.

FIG. 3 shows a schematic illustration of another exemplary embodiment of a diesel particulate matter sensor. Referring to FIG. 3A, sensor 300 comprises a carbon nanostructure layer 302 disposed on a cylindrical substrate 304 connected to an electrical circuit 306 via measuring leads 308. In some embodiments, cylindrical substrate 304 may be a silicon rod. As described above, carbon nanostructure layer 304 may comprise carbon nanostructures 310 that may be at least partially separated structurally and/or electrically isolated from one another.

Figure 3B:
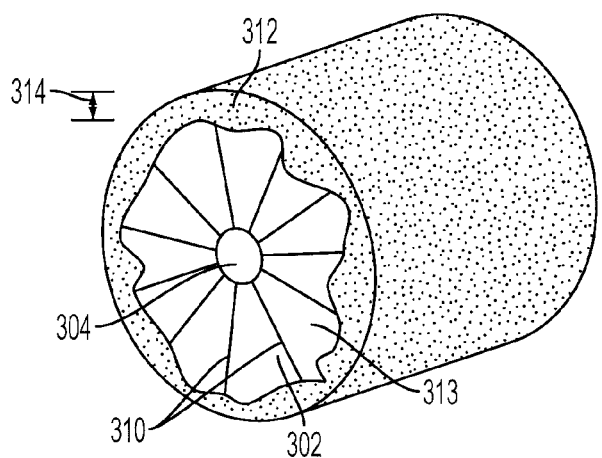

FIG. 3B shows a view of carbon nanostructure layer 302 disposed on cylindrical substrate 304 after an amount of particulate matter 312 may be deposited. It may be understood that, as deposition of particulate matter 312 increases, a thickness 314 of particulate matter accumulated in opening 313 may increase so as to further link carbon nanostructures 310 to one another. As such, various electrical properties of carbon nanostructure layer may be changed and monitored by electrical circuit 306, as described above.

Figure 4:
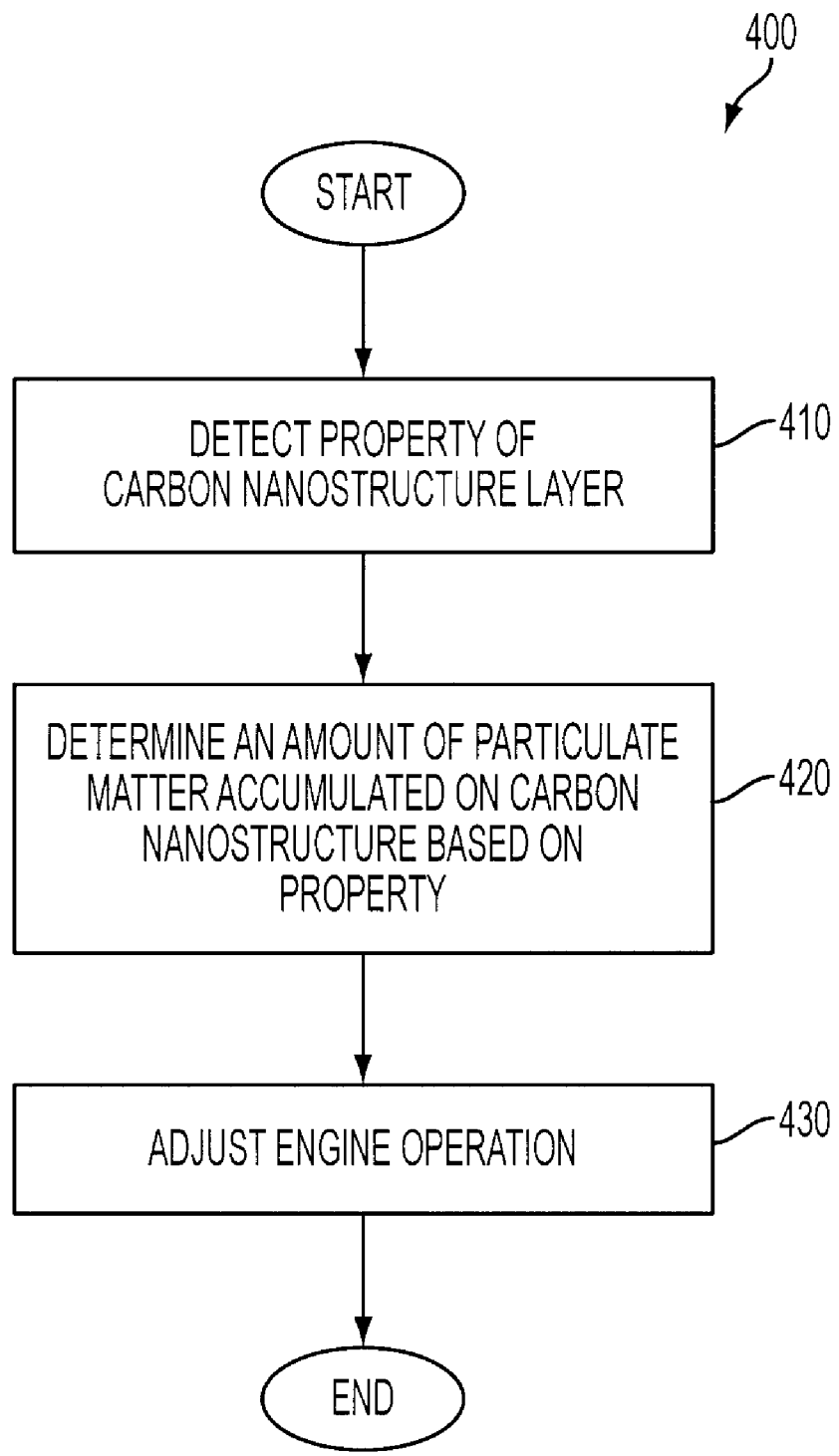
FIG. 4 is a flowchart of an exemplary method for operating an engine and an emission control system comprising a diesel particulate filter.

FIG. 4 shows a flowchart illustrating an embodiment of a method for operating an engine including a diesel particulate filter. In particular, method 400 describes a method of determining an amount of particulate matter accumulated on a carbon nanostructure, as described in sensors 200 and 300, and adjusting engine operation accordingly.

First, at 410, method 400 detects an electrical property associated with the carbon nanostructure. In particular, the electrical property may include a capacitance or impedance of the carbon nanostructure. The electrical property may correspond to an amount of particulate matter accumulated on the carbon nanostructure layer. For example, particulate matter from the engine may accumulate in one or more openings in the carbon nanostructure layer. As such, the accumulated particulate matter may communicate portions of the carbon nanostructure. In some embodiments, the particulate matter may be electrically conductive so as to electrically communicate portions of the carbon nanostructure across an opening defined by the carbon nanostructures. Accordingly, an electrical property associated with the carbon nanostructure layer may change in response to particulate matter accumulated in the carbon nanostructure opening.

It may be understood that various other properties may be measured in response to particulate matter accumulated in the openings of the carbon nanostructure layer. For example, a thermal conductivity or mechanical property may be measured in response to the accumulated particulate matter. Further, various other materials, such as nitrogen oxide, ammonia, etc., may also be accumulated in the openings.

Next, at 420, a measured electrical property may be correlated to an amount of particulate matter accumulated on the carbon nanostructure. For example, a measured resistance and/or capacitance may be attributable to an amount of particulate matter. The amount of particulate matter may be determined by a look-up table, for example. Further, the determined amount of accumulated particulate matter may correspond to an amount of particulate matter from the exhaust stream of the engine and/or a rate of particulate matter emitted from the engine.

It may be appreciated that the property associated with the carbon nanostructure layer may be correlated to characteristics of various other species, such as a concentration of NOx, an identity of a gaseous component, etc.

At 430, engine operation may be adjusted. In particular, engine operation may be adjusted based on the amount of particulate matter. In some embodiments, engine operation may be adjusted based on an amount of particulate matter accumulated on the carbon nanostructure layer. Further, the amount of particulate matter from an exhaust stream of the engine may be compared to the amount of particulate matter accumulated on the carbon nanostructure layer. For example, degradation of the sensor may be determined when an amount of particulate matter accumulated on the carbon nanostructure layer may not correlate to an amount of particulate matter emitted from the engine.

It may be appreciated that degradation of the sensor may be attributable to various conditions, such as thermal decomposition of the carbon nanostructure layer, reduced sensitivity of the sensor as the sensor accumulates particulate matter, cross sensitivity to various other species, corrosive effects of other constituents, such as ammonia, hydrocarbons, biodiesel, etc., rupturing of the carbon nanostructure layer, erosion of the carbon nanostructure layer, various other degradation conditions, or some combination thereof.

As such, engine operation may be adjusted based on a determination of degradation of the particulate matter sensor. In some embodiments, controller 12 may take default action in response to the degradation determination. For example, the diesel particulate filter may be regenerated. In another example, various other emission control mechanisms may be activated to control particulate matter emissions and/or a model for determining an amount of particulate matter emitted from the engine may be activated until the sensor may be diagnosed. For example, an air-fuel ratio may be adjusted. Under some conditions, an air-fuel ratio may be adjusted so as to regenerate diesel particulate filter 71 when the amount of particulate matter accumulated on the carbon nanostructure layer may be greater than a predetermined amount and/or may exceed a predetermined rate.

In another embodiment, controller 12 may prompt a regeneration of the diesel particulate filter in response to feedback from the diesel particulate matter sensor. For example, controller 12 may prompt a regeneration of the diesel particulate filter based on an amount of particulate matter accumulated in the carbon nanostructure layer. Further, an air-fuel ratio provided to the engine may be adjusted based on feedback from the particulate matter sensor.

In yet another embodiment, controller 12 may prompt a regeneration of the diesel particulate matter sensor. For example, the engine may be configured to increase an amount of nitrogen dioxide to the particulate matter sensor. In this way, particulate matter deposited in the carbon nanostructure layer may be oxidized so as to substantially clean the carbon nanostructure layer with reduced degradation of the carbon nanostructures.

It may be appreciated that the order of processing to be detailed is not necessarily required to achieve the features and advantages of the example embodiments described herein, but is provided for ease of illustration and description. One or more of the illustrated acts, steps or functions may be repeatedly performed depending on the particular strategy being used. Further, the described steps, acts, or functions may graphically represent code to be programmed into a computer readable storage medium for the sensor, for example, in the engine control system.

Furthermore, it will be appreciated that the various embodiments of sensors and methods of operating sensors disclosed herein are exemplary in nature, and these specific embodiments are not to be considered in a limiting sense, because numerous variations are possible. The subject matter of the present disclosure includes all novel and non-obvious combinations and subcombinations of the various sensors, methods of operating sensors, and other features, functions, and/or properties disclosed herein. The following claims particularly point out certain combinations and subcombinations regarded as novel and nonobvious. These claims may refer to "a" nanostructure element or the equivalent thereof. Such claims should be understood to include incorporation of one or more such nanostructure elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. In a vehicle comprising a diesel engine and an emissions control system comprising a diesel particulate filter, a method for operating the diesel engine and emission control system, the method comprising:
   correlating a measured property associated with a carbon nanostructure layer to an amount of particulate matter from an exhaust stream of the engine, wherein the carbon nanostructure includes a plurality of carbon nanostructures; and
   adjusting engine operation based on the amount of particulate matter.

2. The method of claim 1, wherein adjusting engine operation further comprises regenerating the diesel particulate filter.

3. The method of claim 1, further comprising comparing the amount of particulate matter from an exhaust stream of the engine to an amount of particulate matter accumulated on the carbon nanostructure layer.

4. The method of claim 1, wherein the property includes an electrical property of the layer.

5. The method of claim 4, wherein the electrical property of the layer is a capacitance or impedance, and where the layer is formed as a mesh.

6. The method of claim 1, wherein the amount of particulate matter from the exhaust stream corresponds to an amount of particulate matter accumulated on the carbon nanostructure layer.

7. The method of claim 6, wherein the carbon nanostructure layer is downstream of the diesel particulate filter, and the amount of particulate matter accumulated on the carbon nanostructure layer is greater than a predetermined amount.

8. The method of claim 1, wherein the carbon nanostructure layer is upstream of the diesel particulate filter.

9. The method of claim 8, further comprising regenerating the diesel particulate filter, and where the layer includes a mesh structure.

10. The method of claim 8, further comprising determining degradation of a sensor based on an operating condition, and taking default action in response to the degradation determination.

11. The method of claim 10, wherein the operating condition is the amount of particulate matter from an exhaust stream of the engine.

12. A sensing method comprising:

accumulating an engine exhaust constituent in openings defined by a plurality of nanostructures in a nanostructure layer, the accumulated constituent communicating a portion of the nanostructure layer with another portion of the nanostructure layer; and correlating a measured response associated with the communication between the portions to a characteristic of the constituent accumulated in the openings, wherein the characteristic is a measure of the constituent accumulated in the openings.

13. The method of claim 12, further comprising applying an electrical current to the nanostructure layer to modify the characteristic correlated to the measured response.

14. The method of claim 12, wherein the measured response is an electrical response associated with the carbon nanostructure layer, the constituent including engine exhaust particulate matter.

* * * * *